Nov. 6, 1962   R. S. MONTGOMERY ETAL   3,061,900
THERMOSETTING COMPOSITION COMPRISING COAL ACIDS, PHENOL
ALDEHYDE RESIN, PLASTICIZER AND POLYAMINE AND
METHOD OF PREPARING SHELL MOLDS THEREFROM
Filed July 23, 1957
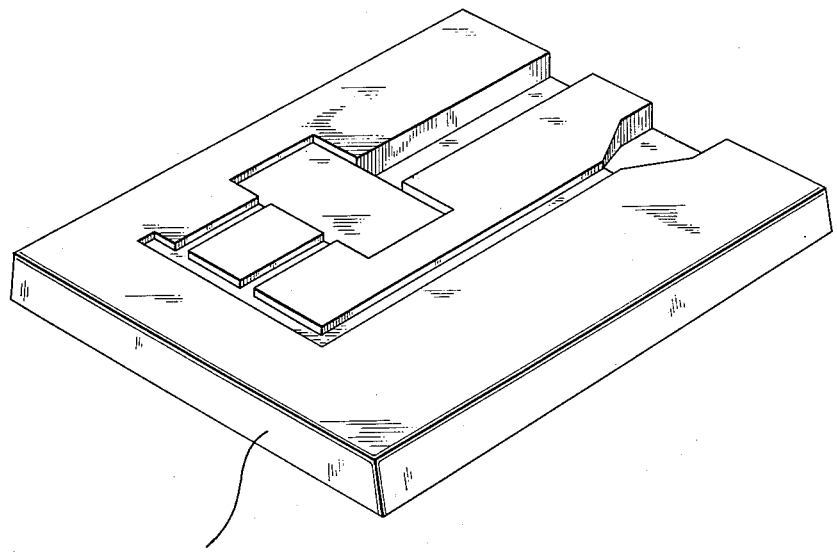
Shell mold bound together
with thermosetting resin-
providing composition
containing coal acids
INVENTORS.
Robert S. Montgomery
John L. Lang
BY
Griswold & Burdick
ATTORNEYS United States Patent Office 3,061,900
Patented Nov. 6, 1962

3,061,900
THERMOSETTING COMPOSITION COMPRISING COAL ACIDS, PHENOL ALDEHYDE RESIN, PLASTICIZER AND POLYAMINE AND METHOD OF PREPARING SHELL MOLDS THEREFROM
Robert S. Montgomery and John L. Lang, Midland, Mich., assignors to The Dow Chemical Company, Midland, Mich., a corporation of Delaware
Filed July 23, 1957, Ser. No. 673,610
15 Claims. (Cl. 22—193)

This invention relates to thermosetting resin-providing compositions comprised of the mixed polycarboxylic aromatic acids derived from the oxidation of coal and the like substances (hereinafter referred to as coal acids) which compositions have pronounced utility for being employed in an adhesive capacity or as a binder material, or both. It has particular reference to such resin-providing compositions that are especially well suited to be utilized as a binder for the preparation of formed composite structures, such as shell molds and the like, that consist of discrete particulate substances bound cohesively together as an integral structure with the thermoset resins provided by the compositions of the invention. The invention is also concerned with the integral formed composite structures that comprise the thermoset resins and that may be obtained with the compositions of the invention. The present application is a continuation-in-part of the now abandoned copending application for United States Letters Patent having Serial Number 612,289, which was filed on September 26, 1956.

It is among the principal objects of the invention to furnish thermosetting resin-providing compositions that are comprised of polycarboxylic acids from the oxidation of coal and like carbonaceous materials.

It is also among the objects of the invention to furnish thermoset resin products from such compositions as well as integral, composite structures that utilize them.

A particular object of the invention is to furnish a thermosetting resin-providing composition that is especially adapted for the preparation of shell molds and the like and to obtain shell molds and the like with such compositions.

Another object of the invention is to make available relatively economical compositions of the indicated nature and for the herein stated purposes.

A further object is to supply a method for the preparation of integral composite structures from discrete particulate substances, especially shell molds, that utilizes the compositions of the invention.

Additional objects and advantages of the invention will be manifest in the following description and specification.

According to the invention, a thermosetting resin-providing composition is comprised of a mixture of coal acids with a "novolak" type phenol-formaldehyde resinous condensation product, including novolak materials that have been etherified with alkylene oxides and the like organic epoxides, that contains a high melting plasticizer and a polyamine curing agent for complexing and cross-linking the coal acids and the phenol-formaldehyde condensation product when the composition is exposed to heat at an elevated thermosetting temperature. Advantageously, between about 4 and 50 percent by weight of coal acids, between about 20 and 90 percent by weight of the phenol-formaldehyde condensation product, between about 2 and 30 percent by weight of the plasticizer and between about 4 and 30 percent by weight of the polyamine curing agent may be employed in the formulation of the resin-providing compositions of the invention. The greatest benefit in the practice of the present invention may frequently be experienced when the proportions of the coal acids and the high melting plasticizer in the resin-providing compositions are of such a relative quantity that their combined presence does not account for more than about 40 percent by weight of the total weight of the composition. Under such conditions, the compositions are generally best adapted, upon being thermoset and cured, to provide articles having optimum strength and characteristics. It may also be an advantage when the weight ratio of coal acids to high melting plasticizer ingredient in the composition is in the neighborhood of about 5 to 1, respectively.

The compositions may be thermoset by exposing them to heat at a temperature between about 350 and 600° F. for a period of time between several seconds and about two minutes and subsequently cured at a usually higher temperature between about 500 and 1200° F. within an additional period of not more than several minutes. The particular thermosetting and curing conditions that are employed depend upon the configuration as well as the constitution of specific composition that may be involved.

The resin-providing compositions of the invention are especially desirable for employment in or as thermosetting adhesives, binders, molding powders, fillers and the like. In this capacity they may be utilized independently or in combination with other ingredients. Particular benefit, as indicated, may be derived when the compositions are employed as binders for the preparation of integral, composite structures from various discrete particulate substances such as sand and similar refractory granular materials that are substantially inert to the resin-providing compositions and do not melt or fuse at the thermosetting and subsequent curing temperatures which may be employed for the compositions. As mentioned, shell molds, which are finding increasing favor for employment in metal casting operations, may advantageously be prepared with the compositions of the invention. The resin-bonded shell molds so-obtained may be fabricated in a manner similar to that which is utilized in the so-called Croning process which has been described in F.I.A.T. Final Report No. 1168 (dated May 30, 1947) by the Field Information Agency, Technical, U.S. Department of Commerce. Shell molds, as is well known, facilitate metal casting operations and ameliorate many foundry techniques. They do not require the use of as much sand as is employed for conventional green sand mold-making operations and eliminate much of the hazard and unpleasantness due to dust and powder that obtains in the practice of the old technique. In addition, they generally permit better castings to be obtained and are lighter and less cumbersome and awkward to handle and manipulate than are conventional sand molds.

A beneficial shell mold preparation mixture of sand and the resin-providing compositions of the invention consists of about 3 to 10 percent by weight of the resin composition, based on the weight of the sand in the mixture, which advantageously may be of foundry core or "steel" quality such as washed ganister, clean sea sand and the like, as is hereinafter more particularly delineated. Frequently, a mixture of sand that contains in the neighborhood of 5–7 percent by weight of the resin-providing composition of the invention may be found suitable for the preparation of shell molds. A particularly contain considerable quantities of tri- and tetration of shell molds, especially when the hereinafter-suggested preferred ingredients or their equivalents are utilized, may comprise about 20–25 percent by weight of coal acids, about 60–65 percent by weight of a phenol-formaldehyde novolak resin, about 5 percent by weight of the high melting plasticizer, and about 10–15 percent by weight of the polyamine curing agent. One of the halves of a shell mold prepared with a thermosetting resin-providing composition in accordance with the invention is illustrated in the accompanying drawing.

The coal acids that are employed in the composition of the invention which are essentially mixed aromatic polycarboxylic acids may be identical with or similar to those which may be obtained by the oxidation with gaseous oxygen, which may be contained in the air, of an aqueous alkaline slurry of a finely divided carbonaceous material selected from the group consisting of coal and coke that has been obtained by the carbonization of coal at temperatures beneath about 1300° F. Coal acids that have been obtained by the nitric acid oxidation of suitable carbonaceous materials are also generally satisfactory. Likewise, if desired, synthetic or especially prepared and compounded "artificial" mixtures of the coal acids may also be utilized. Such coals that are of the varieties known as anthracite, bituminous, sub-bituminous and lignite and other low grade coals are generally suitable for production of coal acids. Satisfactory cokes are those produced according to conventional techniques from coal at a temperature beneath about 1300° F. The utilization of higher coking temperatures frequently causes the cokes that are obtained to be graphitic and rendered unsuitable for conversion to coal acids in satisfactory yields.

The preparation of coal acids from coal may, by way of illustration, involve mixing a ground bituminous coal with a caustic alkali, such as sodium hydroxide, and water, using an excess of the caustic with respect to the amount that is contemplated as being required for neutralizing the coal acids formed. Generally, an apparatus is employed that is constructed from a corrosion-resisting material of construction and that is adapted for operation under pressure. The apparatus is also equipped with an efficient mixing or agitating mechanism and with suitable heat-exchanging means. The weight ratio of the charged ingredients may, for example, be in the proportion of about 3 parts by weight of the coal to 9 parts by weight of the caustic alkali to 125 parts by weight of water. Oxygen is bubbled through the agitated charged ingredients while they are maintained at a temperature between about 390 and 575° F. and under a pressure of from about 500 to 1200 pounds per square inch (gauge). The exothermic reaction is continued until substantially all of the carbonaceous ingredients of the coal have gone into solution. This usually requires a period of time between about 2 and 3 hours. In the oxidation reaction that occurs, about half of the carbon in the coal is converted to organic acid compounds while the remainder is oxidized to carbon dioxide. Upon termination of the reaction and cooling of the reaction mass, the coal ash is filtered out of the alkaline neutralized coal acid solution that is obtained.

The coal acids may then be isolated by acidifying the solution with sulfuric acid and, after filtration, recovering the free, water-soluble coal acids by extraction with a suitable water-immiscible solvent, such as methyl ethyl ketone, which does not dissolve in water in the presence of such salts as sodium sulfate as is obtained in the acidified free coal acid solution. Evaporation and drying techniques may be employed for subsequently isolating the free coal acids. The coal acids may thus be prepared as solid materials that are often pulverized for subsequent handling in a powder form.

The free coal acid product which is a hydroscopic, usually yellowish, essentially water soluble material is believed to be substantially comprised of various aromatic polycarboxylic acids. The average molecular weight of the coal acids that are ordinarily obtained is frequently in the neighborhood of 250–270; being seldom less than 200 or more than 300. Their average equivalent weight is generally about 80, seldom being less than 70 or more than 90. The free coal acids ordinarily appear to have an average of 2.5 to 5 carboxylic groups per molecule with an apparent average of about 3 to 4 being common. While their exact chemical nature and constitution may be somewhat conjectural, they evidently contain considerable quantities of tri- and tetracarboxylic benzene acids as well as aromatic acids having more complex nuclei. Frequently, for example, the greatly preponderant proportion of aromatic nuclei obtained in coal acids prepared in the described fashion have been found to consist of methylnaphthalene, benzene, biphenyl, napthalene, phenanthrene, alkyl benzene, benzophenone and toluene nuclei.

As has been indicated, the coal acids constituent in the compositions of the invention are complexed and cross-linked by the polyamine curing agent that is employed. There is thereby obtained a resinous product which contributes to the properties of the resulting resin. The complexed and cross-linked coal acids product has pronounced binding capacity to assist the novolak resin in such function. In addition, due to its relatively more economical nature, the resinous coal acids product may also be throught to serve as an extender for the novolak resin in the present compositions.

The phenol-formaldehyde condensation product that is employed in the resin-providing compositions of the invention may be the conventional type of novolak resin that, for example, is a condensation product of a phenolic constituent and an aldehyde (such as formaldehyde) and which advantageously contains from three to ten phenolic units in its molecule and is prepared from the common phenol, $C_6H_5OH$, or substituted derivatives thereof. If desired, as has been indicated, the novolak resin that is employed may be a material that has been etherified to any desired extent with low molecular weight alkylene oxides and the like to provide hydroxy alkylene ethers of the phenol-formaldehyde or other phenol-aldehyde condensation product.

The high melting plasticizer ingredient that is employed may advantageously be a thermoplastic or heat-softenable substance which is adapted to exert a plasticizing or flow-assisting influence on the composition, particularly on the coal acids contained therein, prior to exposure of the composition to a thermosetting temperature. In general, the materials that may be utilized as a high melting plastizer should be relatively non-volatile; capable of being comminuted readily in and with conventional means (such as ball mills) to finely divided discrete particle form; and quickly meltable within or beneath the lower end of the thermosetting temperature range of the compositions of the invention. Frequently, the substances that are suitable may be found to have a melting point between about 150 and 500° F. In many cases it may be preferable to utilize as a high melting plasticizer a substance having the indicated characteristic properties with a melting point between about 200 and 400° F.

Advantageously a low molecular weight polystyrene or the like alkenyl aromatic polymeric material may be employed as the high melting plasticizer ingredient in the composition of the present invention. Such styrene polymers that have a molecular weight between about 10,000 and 40,000 may be employed with especial benefit as may be analogous low molecular weight copolymers of styrene with various other monomers. In the latter category may be mentioned copolymers of styrene and allyl alcohol which have a relatively low molecular weight within in the indicated range and that contain in the polymer molecule about 5 to 10 percent or so by weight of allyl alcohol. Other polymeric substances that may be satisfactorily employed include such materials as polyacrylamide, polymethacrylamide, low viscosity grade (say up to about 10–15 cps.) ethyl cellulose ethers and high molecular weight polyglycols derived from ethylene oxide, propylene oxide, butylene oxide and mixtures thereof having the indicated desired properties. Typical of such a polyglycol is one that has been obtained by the condensation of ethylene oxide to a normally solid thermoplastic product having a molecular weight of about 2 to 4 thousand, or so. Many polymeric substances may be satisfactorily employed as high melting plasticizers for the compositions of the invention for the reasons that they have suitable plasticizing, thermoplastic and flow-assisting properties; are obtainable in finely divided form (or sufficiently hard and friable to be easily rendered so); and are usually non-fugacious in nature.

In many cases, however, other materials that the not polymeric in nature may also be utilized as the high melting plasticizer ingredient. For example, biphenylene oxide, magnesium stearate, and carnauba and equivalent waxes may be employed in such capacity. The determination of the suitability of various substances as high melting plasticizers may be made by simple tests capable of being easily performed by persons who are skilled in the art. By way of illustration, an easy and reliable way to determine the efficacy of a particular substance as a high melting plasticizing ingredient consists of mixing four parts by weight of coal acids, one part of the substance being tested as a plasticizer and one-eighth part of hexamethylenetetramine and stroking the resulting composition on a hot plate at a temperature of about 300° F. Generally if the plasticizing ingredient functions suitably to plasticize the test mixture under the indicated stroke test, it will be found to work satisfactorily in the compositions of the present invention.

The polyfunctional amine compounds that may be employed for the preparation of the resin-providing compositions in the practice of the invention may advantageously be selected from the group of polyamines that are represented by either of the formulae: $H_2N—RNH_2$ and $H_2N—(R—NH—R)_n—NH_2$, wherein R may be any $C_2$ to $C_{10}$ aliphatic (advantageously saturated hydrocarbon aliphatic) or $C_6$ to $C_{14}$ aromatic radical and $n$ is a whole integer. Other functionally equivalent polyamine compounds such as piperazine, the various substituted piperazines and melamine (in which the nitrogen atoms are part of a heterocyclic molecular structure) may also be utilized. In the interests of economy, however, it is generally an advantage to utilize relatively low molecular weight aliphatic polyamines for the preparation of the resinous compositions. Polyamines that may be included in this category include hexamethylenediamine, hexamethylenetetramine, ethylenediamine, diethylenetriamine, triethylenetetramine and the like relatively low molecular weight polyamines.

As has been indicated in the foregoing, any ordinary sand or other refractory material in discrete particle form may be employed in the practice of the present invention when it is desired to utilize the resinous compositions as binders for the preparation of such formed composite structures as shell molds and the like. Advantageously, the sand or its equivalent that is employed has a fineness in accordance with the values proposed by the American Foundryman's Society (AFS) that is in the numerical range between about 25 and 180. Such sands, for example, as the types which are known as Berkeley Float Sand, Juniata Sand, Lake Sand, Vassar Sand, Wedron Sand and the like may be beneficially employed. It is ordinarily desirable for the sand that is utilized to be clean and substantially free from foreign metal oxides, clay, moisture and organic matter. In many cases, particularly when shell molds are being fabricated, it may be more advantageous to employ a sand having an AFS fineness number from about 50 to 125. Very frequently, sands that have an AFS fineness number in the neighborhood of 100 may be preferable.

The invention is further illustrated in and by the following examples wherein, unless otherwise indicated, all parts and percentages are to be taken by weight.

*Example "A"*

A composition consisting of about 36 percent of novolak resin, 25 percent of free coal acids, 25 percent of a low molecular weight copolymer of allyl alcohol and styrene and 14 percent hexamethylenetetramine was prepared by intimately mixing the indicated proportions of the mentioned ingredients in a ball mill. The novolak resin that was employed has been obtained by condensing about 1 mole part of common phenol with about 0.8 mole part of formaldehyde in the presence of an oxalic acid catalyst. The resinous novolak condensation product had a bar melting point of about 212° F. The free coal acids which were utilized had been obtained in the indicated manner by the caustic oxidation of Pocahantas No. 3 bituminous coal. The coal acids had a molecular weight of about 270 and an equivalent weight of about 82.7. They were found to contain about 52.7 percent of combined carbon and 3.4 percent of combined hydrogen. The low molecular weight copolymer of styrene and allyl alcohol contained in the polymer molecule about 5 percent by weight of the allyl alcohol and had a melting point between about 300 and 400° F.

About 6 percent of the thereby obtained resin-providing composition was then intensively mixed with about 94 percent of AFS 100 Foundry sand which was suitable for shell molding purposes. The resulting sand-resin mixture was placed on a metal pattern which was maintained at a temperature of about 410° F. The mixture was thermoset on the heated form platen and subsequently cured at a higher temperature to provide a strong, good quality specimen which permitted the preparation of excellent iron castings in accordance with shell molding techniques when the structures were utilized for such purposes.

*Example "B"*

A resin mixture was made up with the following composition, using the same ingredients and procedures as in the first example excepting where otherwise noted.

29 percent novolak resin
29 percent free coal acids
29 percent of a high melting polystyrene having a specific gravity of about 1.26; a refractive index of about 1.59; a viscosity when dissolved in a 30 percent toluene solution between 12 and 20 centipoises (cps.); a thermal softening range of 140–200° F.; and molecular weight values of about 22,000 by viscometric methods and 27,000 by light scattering techniques.
13 percent hexamethylenetetramine When the above mixture was compounded with sand in the same manner as set forth in the first example, an excellent shell molding composition was obtained.

*Example "C"*

Following the procedure of Example "B" and using the same ingredients therein described, an excellent resin-providing composition was prepared consisting of about 52 percent of the novolak resin, 28 percent of the free coal acids, 7 percent of the low molecular weight polystyrene plasticizer ingredient and 13 percent of the hexamethylenetetramine. Compositions of the resin-providing mixture with sand containing about 94 percent of the latter were found to provide excellent shell molds when thermoset and cured on heated form platens in the mentioned optimum thermal ranges.

What is claimed is:

1. Thermosetting, resin-providing composition comprised of a mixture of (a) between about 4 and 50 percent by weight of coal acids that are the water-soluble, mixed aromatic polycarboxylic acid products of the class obtained by oxidation of coal, which acids have an average molecular weight of from 200 to 300, an apparent average equivalent weight of from 70 to 90, and contain an average of from 2.5 to 5 carboxylic groups per aromatic nucleus in their molecule; and (b) between about 20 and 90 percent by weight of a resinous novolak condensation product of a phenol and an aldehyde that contains from 3 to 10 phenolic units in its molecule; (c) between about 2 and 30 percent by weight of a high melting plasticizer ingredient which melts at a temperature between about 150 and 500° F. and which is adapted to plasticize said coal acids when stroked on a hot plate at 300° F. in a composition with said coal acids consisting of about four parts by weight of said coal acids, one part by weight of said high melting plasticizer ingredient and one-eighth part by weight of hexamethylenetetramine; and (d) between 4 and 30 percent by weight of a polyamine curing agent selected from the group of polyamines consisting of piperazine, substituted piperazines, melamine, polyamines of the formulae:

$H_2N—R—NH_2$ and $H_2N—(R—NH—R)_n—NH_2$ wherein each R is taken from the class consisting of $C_2$ to $C_{10}$ aliphatic radicals and $C_6$ to $C_{14}$ aromatic radicals and $n$ is a whole integer, and mixtures thereof.

2. The composition of claim 1, wherein the proportions of the coal acids and the high melting plasticizer are such that their combined presence is less than about 40 percent by weight of the total weight of the composition.

3. A composition in accordance with the composition set forth in claim 2, wherein about 5 parts by weight of said coal acids are present for each part by weight of said high melting plasticizer in said composition.

4. The composition of claim 1, wherein the plasticizer ingredient has a melting point between about 200 and 400° F.

5. The composition of claim 1, wherein the plasticizer ingredient is polystyrene having a molecular weight between about 20,000 and 40,000.

6. The composition of claim 1, wherein the polyamine curing agent is hexamethylenetetramine.

7. The composition of claim 1, characterized in being thermosetting when exposed to heat at a temperature between about 350 and 600° F. and subsequently cured at a temperature between about 500 and 1200° F.

8. A thermoset resinous product comprising a cured composition that is in accordance with the composition set forth in claim 1.

9. Thermosetting mass for forming integral composite structures consisting of sand that has been intimately blended with a minor proportion in excess of about 3 percent by weight, based on the weight of the mass, of a thermosetting, resin-providing composition that is in accordance with the composition set forth in claim 1.

10. Thermosetting mass for forming integral composite structures consisting of sand that has been intimately blended with between about 3 and 10 percent by weight, based on the weight of the mass, of a thermosetting resin-providing composition that is in accordance with the composition set forth in claim 1.

11. An integral composite structure that has been fabricated from a thermosetting mass that is in accordance with the thermosetting mass set forth in claim 10.

12. Thermosetting preparation for the manufacture of shell molds that consist of an intimate mixture of sand and a thermosetting resin-providing composition, said preparation containing between about 5 and 7 percent by weight of said resin-providing composition, based on the weight of said preparation, said thermosetting resin-providing composition being comprised of a mixture of (a) between about 20 and 25 percent by weight of coal acids that are the water-soluble, mixed aromatic polycarboxylic acid products of the class obtained by oxidation of coal, which acids have an average molecular weight of from 200 to 300, an apparent average equivalent weight of from 70 to 90, and contain an average of from 2.5 to 5 carboxylic groups per aromatic nucleus in their molecule; (b) between about 60 and 65 percent by weight of a resinous novolak condensation product of a phenol and an aldehyde that contains from 3 to 10 phenolic units in its molecule; (c) about 5 percent by weight of a high melting plasticizer ingredient which melts at a temperature between about 150 and 500° F. and which is adapted to plasticize said coal acids when stroked on a hot plate at 300° F. in a composition with said coal acids consisting of about four parts by weight of said coal acids, one part by weight of said high melting plasticizer ingredient and one-eighth part by weight of hexamethylenetetramine; and (d) between about 10 and 15 percent by weight of a polyamine curing agent selected from the group of polyamines consisting of piperazine, substituted piperazines, melamine, polyamines of the formulae: $H_2N—R—NH_2$ and $H_2N—(R—NH—R)_n—NH_2$ wherein each R is taken from the class consisting of $C_2$ to $C_{10}$ aliphatic radicals and $C_6$ to $C_{14}$ aromatic radicals and $n$ is a whole integer, and mixtures thereof.

13. A shell mold that has been fabricated from a thermosetting preparation that is in accordance with the preparation set forth in claim 12.

14. Method for the fabrication of thermoset, integral composite structures which comprises intimately blending a major proportion of sand with a minor proportion that is in excess of about 3 percent by weight, based on the weight of the resulting blend, and less than the weight of sand in said resulting blend of a thermosetting, resin-providing composition that consists of a mixture of (a) between about 4 and 50 percent by weight of coal acids that are the water-soluble, mixed aromatic polycarboxylic acid products of the class obtained by oxidation of coal, which acids have an average molecular weight of from 200 to 300, an apparent average equivalent weight of from 70 to 90, and contain an average of from 2.5 to 5 carboxylic groups per aromatic nucleus in their molecule; (b) between about 20 and 90 per cent by weight of a resinous novolak condensation product of a phenol and an aldehyde that contains from 3 to 10 phenolic units in its molecule; (c) between about 2 and 30 percent by weight of a high melting plasticizer ingredient which melts at a temperature between about 150 and 500° F. and which is adapted to plasticize said coal acids when stroked on a hot plate at 300° F. in a composition with said coal acids consisting of about four parts by weight of said coal acids, one part by weight of said high melting plasticizer ingredient and one-eighth part by weight of hexamethylenetetramine; and (d) between about 4 and 30 percent by weight of a polyamine curing agent selected from the group of polyamines consisting of piperazine, substituted piperazines, melamine, polyamines of the formulae: $H_2N—R—NH_2$ and $H_2N—(R—NH—R)_n—NH_2$ wherein each R is taken from the class consisting of $C_2$ to $C_{10}$ aliphatic radicals and $C_6$ to $C_{14}$ aromatic radicals and $n$ is a whole integer, and mixtures thereof; forming the blended ingredients to a desired shape; and subsequently subjecting them in shaped form to thermosetting with heat at a temperature between about 350 and 600° F. and curing with heat at a temperature between about 500 and 1200° F. until said shaped article has been thermoset and cured by the influence of said heat at said elevated thermosetting and curing temperatures.

15. Method for the fabrication of shell moldings which comprises intimately blending sand having an AFS fineness number that is in the numerical range between about 25 and 180 with between about 3 and 10 percent by weight, based on the weight of the resulting blend, of a thermosetting, resin-providing composition: said thermosetting resin-providing composition being comprised of a mixture of (a) between about 4 and 50 percent by weight of coal acids that are the water-soluble, mixed aromatic polycarboxylic acid products of the class obtained by oxidation of coal, which acids have an average molecular weight of from 200 to 300, an apparent average equivalent weight of from 70 to 90, and contain an average of from 2.5 to 5 carboxylic groups per aromatic nucleus in their molecule; (b) between about 20 and 90 percent by weight of a resinous novolak condensation product of a phenol and an aldehyde that contains from 3 to 10 phenolic units in its molecule; (c) between about 2 and 30 percent by weight of a high melting plasticizer ingredient which melts at a temperature between about 150 and 500° F. and which is adapted to plasticize said coal acids when stroked on a hot plate at 300° F. in a composition with said coal acids consisting of about four parts by weight of said coal acids, one part by weight of said high melting plasticizer ingredient and one-eighth part by weight of hexamethylenetetramine; and (d) between 4 and 30 per cent by weight of a polyamine curing agent selected from the group of polyamines consisting of piperazine, substituted piperazines, melamine, polyamines of the formulae: $H_2N$—R—$NH_2$ and $$H_2N-(R-NH-R)_n-NH_2$$

wherein each R is taken from the class consisting of $C_2$ to $C_{10}$ aliphatic radicals and $C_6$ to $C_{14}$ aromatic radicals and $n$ is a whole integer, and mixtures thereof; forming the blended ingredients to a molded shape; and subsequently subjecting them in said mold shape form to thermosetting with heat at a temperature between about 350 and 600° F. and curing with heat at a temperature between about 500 and 1200° F. until said mold shaped forms are thermoset and cured by the influence of said heat at said elevated thermosetting and curing temperatures.

References Cited in the file of this patent
UNITED STATES PATENTS

| | | |
|---|---|---|
| 2,244,192 | Flory | June 3, 1941 |
| 2,440,516 | Kropa | Apr. 27, 1948 |
| 2,706,163 | Fitko | Apr. 12, 1955 |
| 2,806,832 | Drumm et al. | Sep. 17, 1957 |
| 2,895,936 | Archer et al. | July 21, 1959 |

FOREIGN PATENTS

| | | |
|---|---|---|
| 492,906 | Great Britain | Sept. 29, 1938 |
| 548,220 | Great Britain | Oct. 1, 1942 |

OTHER REFERENCES

Boundy et al.: "Styrene, Its Polymers, Copolymers and Derivatives," published by Reinhold Publishing Company, 1952, pages 812–822.

UNITED STATES PATENT OFFICE
CERTIFICATE OF CORRECTION

Patent No. 3,061,900            November 6, 1962

Robert S. Montgomery et al.

It is hereby certified that error appears in the above numbered patent requiring correction and that the said Letters Patent should read as corrected below.

In the heading to the sheet of drawings, line 2, and in the heading to the printed specification, line 2, for "COMPOSITION", each occurrence, read -- COMPOSITIONS --; column 2, line 63, for "contain considerable quantities of tri- and tetra-" read -- beneficial resin-providing composition for the prepara- --.

Signed and sealed this 18th day of June 1963.

(SEAL)
Attest:

ERNEST W. SWIDER            DAVID L. LADD
Attesting Officer            Commissioner of Patents